US005911605A

United States Patent [19]

Wooldridge et al.

[11] Patent Number: 5,911,605

[45] Date of Patent: Jun. 15, 1999

[54] UNIVERSAL TERMINAL CONNECTION

[75] Inventors: George Wooldridge, Warren; David J. Berels, Belleville, both of Mich.

[73] Assignee: UI Automotive Dearborn, Inc., Dearborn, Mich.

[21] Appl. No.: 08/951,401

[22] Filed: Oct. 16, 1997

[51] Int. Cl.[6] .................... H02R 11/03

[52] U.S. Cl. .................... 439/790; 439/843

[58] Field of Search .................... 439/290, 291, 439/842, 843, 845, 884

[56] References Cited

U.S. PATENT DOCUMENTS

| | | | |
|---|---|---|---|
| 2,785,387 | 3/1957 | Batcheller | 439/290 |
| 3,208,030 | 9/1965 | Evans et al. | 439/290 |
| 3,845,451 | 10/1974 | Neidecker | 439/290 |
| 4,720,157 | 1/1988 | Nestor et al. | 439/843 |
| 5,035,639 | 7/1991 | Kilpatrick et al. | 439/290 |
| 5,433,630 | 7/1995 | Inaba et al. | 439/843 |
| 5,435,739 | 7/1995 | Inaba et al. | 439/291 |

*Primary Examiner*—Paula Bradley
*Assistant Examiner*—T C Patel
*Attorney, Agent, or Firm*—Howard & Howard

[57] ABSTRACT

An electrical terminal connection is made by interconnecting two identical terminals having U-shaped blades. In the past, electrical connections have typically been made by inserting a blade terminal into a receptacle terminal. One embodiment of the inventive connection includes a terminal having a spring contact strip with a plurality twisted contact louvers within each U-shaped blade. Another embodiment of the inventive connection includes a terminal having a U-shaped blade with corrugated sides. Both embodiments increase the contact area while reducing the engagement force necessary to mate the terminals.

12 Claims, 3 Drawing Sheets

Fig-8
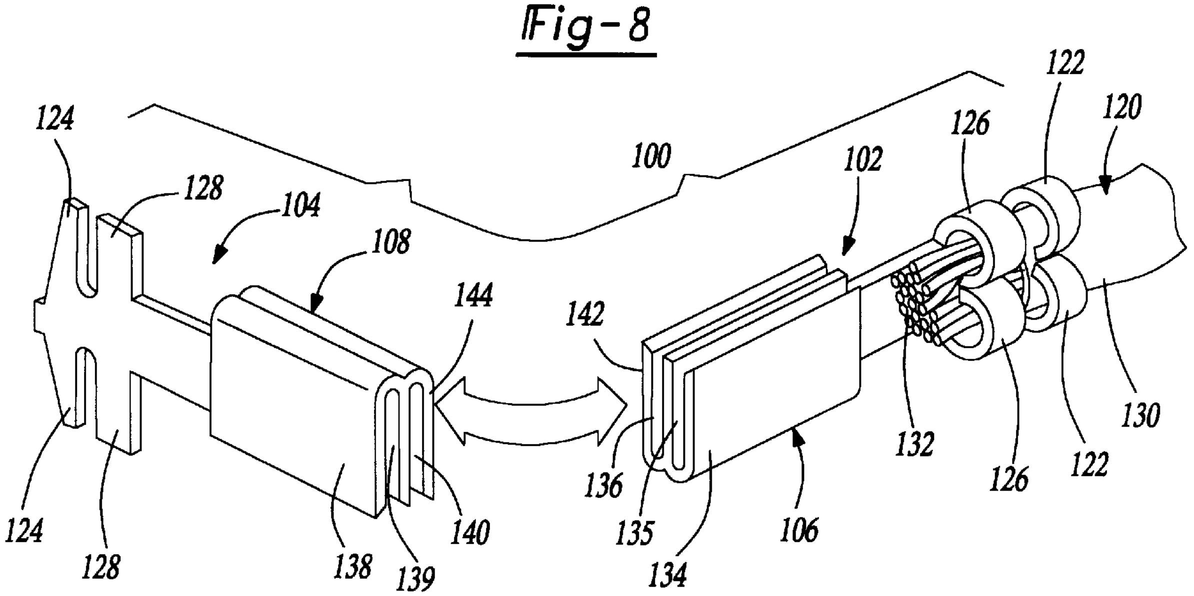
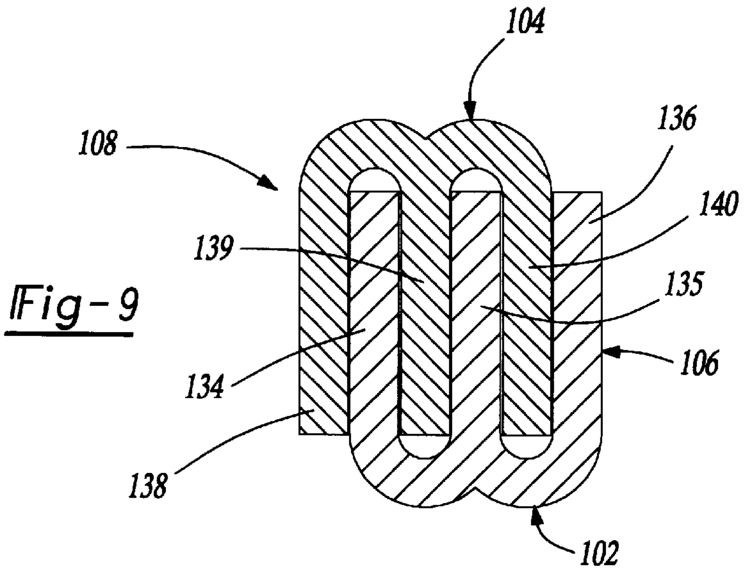
Fig-9

UNIVERSAL TERMINAL CONNECTION

BACKGROUND OF THE INVENTION

This invention relates to an electrical terminal connection formed of two generally identical parts.

Conventional electrical connections are typically comprised of a male blade terminal and a female receptacle terminal. An electrical connection is made when the blade terminal is inserted into the receptacle terminal. One shortcoming of conventional electrical connections is that the blade terminal and the receptacle terminal each require separate design, tooling, and inventory costs. Further, the known male/female terminals do not ensure a large number of contact points, or contact area.

Other shortcomings of the prior art include the complex manufacturing necessary to form the terminals. Additional shortcomings emerge when conventional electrical connections are utilized in a high voltage environment. To handle higher current, the blade and receptacle terminals are scaled to larger dimensions. These larger terminals require a greater engagement force. As a result, several prior art connectors have incorporated additional mechanical structure to provide lever assistance for engaging the mating terminals. Accordingly, there is a need for an improved electrical terminal connection which overcomes these shortcomings of the prior art.

SUMMARY OF THE INVENTION

The present invention provides an electrical terminal connection made by interconnecting two generally identical terminals having U-shaped blades. Since both terminals may be identical, the disclosed invention reduces design, tooling, manufacturing, and inventory costs.

One embodiment of the inventive connection includes a terminal having a spring contact strip fixed within each U-shaped blade. The spring contact strip has a plurality twisted contact louvers. Another embodiment of the inventive connection includes a terminal having a U-shaped blade with corrugated sides. All of these embodiments reduce the engagement force necessary to mate terminals. More importantly, the non-planar sides ensure a larger contact area with a number of contact points.

These and other features of this invention will be best understood from the following specification and drawings, the following of which is a brief description.

BRIEF DESCRIPTION OF THE DRAWINGS

FIG. 8 shows a perspective view of a fourth embodiment of an electrical terminal connection; and FIG. 9 shows a cross-sectional view of the interconnected FIG. 8 terminals.

DETAILED DESCRIPTION OF THE PREFERRED EMBODIMENT

Figure 1:
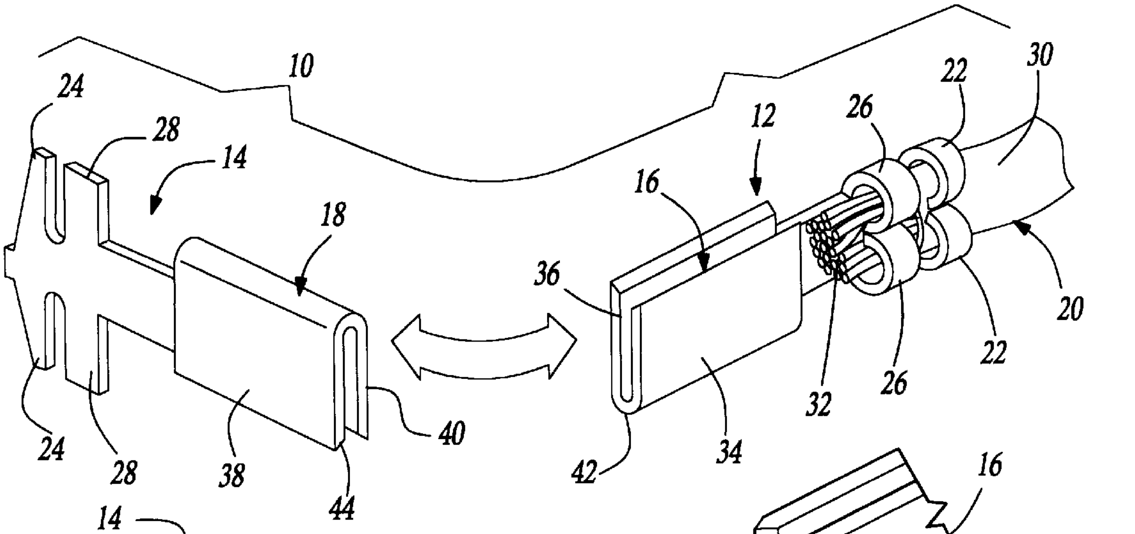
FIG. 1 shows a perspective view of a first embodiment of an electrical terminal connection.

FIG. 1 shows a first embodiment of an electrical terminal connection 10 including two identical terminals 12 and 14 having U-shaped blades 16 and 18 respectively. Terminals 12 and 14 are made of an electrically conductive material, preferably copper. Terminal 12 has been crimped to an insulated electrical wire or cable 20. Terminal 14 shows the shape of a terminal prior to installation upon a wire. Terminals 12 and 14 are shown in an opposed position, with terminal 14 rotated 180° with respect to terminal 12. Connection 10 is designed to connect two opposed wires end to end along a single line.

Each terminal 12 and 14 includes a pair of retaining tabs 22 and 24 and a pair of conducting tabs 26 and 28 respectively. Retaining tabs 22 of terminal 12 have been crimped to an insulated portion 30 of wire 20 and conducting tabs 26 of terminal 12 have been crimped to an exposed or uninsulated portion 32 of wire 20. Conducting tabs 26 and 28 are integral with U-shaped blades 16 and 18 respectively.

U-shaped blades 16 and 18 include a pair of spaced legs 34, 36 and 38, 40 respectively. Each pair of spaced legs 34, 36 and 38, 40 is adapted to spread during engagement with a mating terminal. Additionally, each U-shaped blade 16 and 18 has a forward end 42 and 44 respectively.

Figure 2:
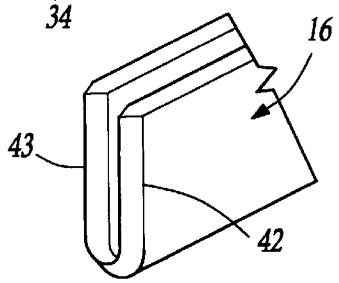
FIG. 2 shows an enlarged view of a forward end of a FIG. 1 terminal.

FIG. 2 shows an enlarged view of a forward end 42 of U-shaped blade 16 having a chamfered edge 43. Each forward end 42 and 44 is chamfered to facilitate the alignment and initial engagement of U-shaped blades 16 and 18.

Figure 3:
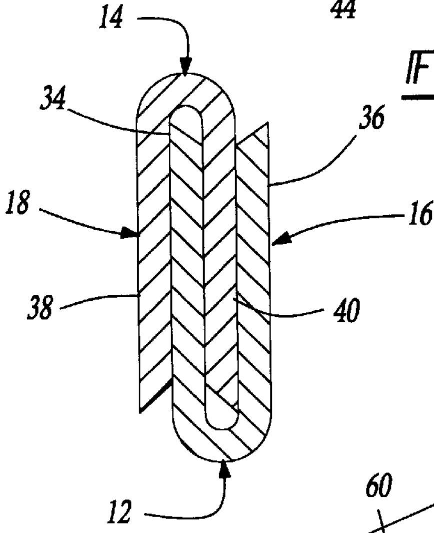
FIG. 3 shows a cross-sectional view of the interconnected FIG. 1 terminals.

To interconnect U-shaped blades 16 and 18 and make an electrical connection, leg 34 of terminal 12 is sandwiched or slid between spaced legs 38 and 40 of terminal 14 while leg 40 of terminal 14 is sandwiched or slid between spaced legs 34 and 36 of terminal 12. FIG. 3 shows a cross-sectional view of U-shaped blades 16 and 18 interconnected. One skilled in the art will appreciate that connection 10 may also be made by sandwiching leg 36 of terminal 12 between legs 38 and 40 of terminal 14 and leg 38 of terminal 14 between legs 34 and 36 of terminal 12.

Figure 4:
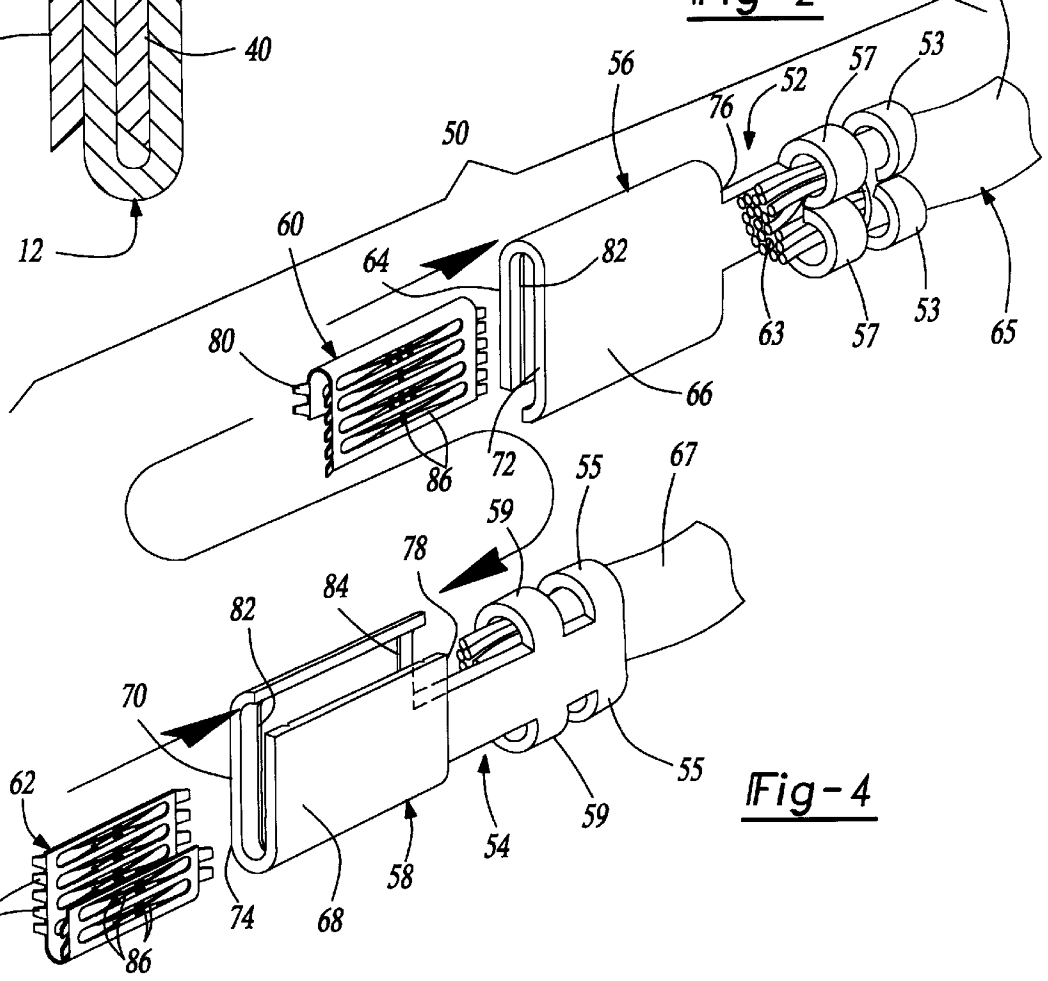
FIG. 4 shows a perspective view of a second embodiment of an electrical terminal connection.

FIG. 4 shows a second embodiment of an electrical terminal connection 50 including two identical terminals 52 and 54 having U-shaped blades 56 and 58 and spring contact strips 60 and 62 respectively. Terminals 52 and 54 are made of an electrically conductive material, preferably copper. Spring contact strips 60 and 62 are preferably made of beryllium copper, although other conductive materials may be used. Terminals 52 and 54 have been crimped to insulated electrical wires or cables 65 and 67 respectively. Terminals 52 and 54 are shown oriented in the same direction, with terminal 54 rotated 180° with respect to terminal 52. The ends of wires 65 and 67 may be routed in any direction any from this connection.

Each terminal 52 and 54 further includes a pair of retaining tabs 53 and 55 and a pair of conducting tabs 57 and 59 respectively. Retaining tabs 53 of terminal 52 have been crimped to an insulated portion 61 of wire 65 and conducting tabs 57 of terminal 52 have been crimped to an exposed or uninsulated portion 63 of wire 65. Conducting tabs 57 and 59 are in electrical communication with U-shaped blades 56 and 58 respectively.

U-shaped blades 56 and 58 include a pair of spaced legs 64, 66 and 68, 70 respectively. Additionally, each U-shaped blade 56 and 58 has a forward end 72 and 74 and a rearward end 76 and 78 respectively. Spring contact strips 60 and 62 are fixed between legs 64, 66 and 68, 70 respectively prior to the interconnection of terminals 52 and 54. The longitudinal edges of each spring contact strip 60 and 62 include a plurality of retaining fingers 80 adapted to be spring loaded into grooves 82 and 84 extending between legs 64, 66 and 68, 70 respectively. The middle portion of each spring contact strip 60 and 62 includes a plurality of louvers 86 bent to be non-planar relative to the remainder of the strip.

Figure 5:
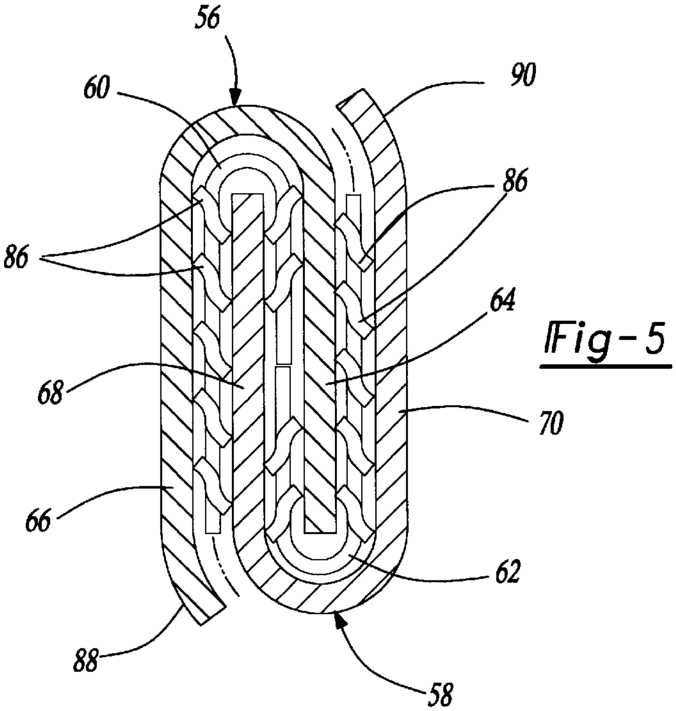
FIG. 5 shows a cross-sectional view of the interconnected FIG. 4 terminals.

To interconnect terminals 52 and 54 and make an electrical connection, leg 64 of U-shaped blade 56 is sandwiched or slid between spaced legs 68 and 70 of U-shaped blade 58 while leg 68 of U-shaped blade 58 is sandwiched or slid between spaced legs 64 and 66 of U-shaped blade 56. FIG. 5 shows a cross-sectional view of U-shaped blades 56 and 58 lined with spring contact strips 60 and 62 and interconnected. As best shown in this cross-sectional view, spring contact strips 60 and 62 are preferably sized so as to not overlap one another when U-shaped blades 56 and 58 are interconnected.

As can be seen, each louver 86 is rotated or twisted with respect to the plane each strip 60 and 62. When U-shaped blades 56 and 58 are interconnected, each louver 86 provides both a mating and a retaining function. As mating structure, each louver 86 contacts both U-shaped blades 56 and 58 thereby deforming each louver towards a position generally flush with the plane of each strip 60 and 62. As retaining structure, each louver 86 applies a force upon both U-shaped blades 56 and 58 as the louver attempts to return to its original twisted position. As can be appreciated from FIG. 5, with this embodiment there is a very large contact area with a large number of contact points. The contact area is as much as 50% greater than prior made/female connections.

Leg 66 of U-shaped blade 56 and leg 70 of U-shaped blade 58 include a lipped end portion 88 and 90 respectively. Lipped end portions 88 and 90 act as a further retainer. One skilled in the art will appreciate that lipped end portions 88 and 90 are not necessary to practice the claimed invention. Further, one skilled in the art will recognize that U-shaped blades 16 and 18 of the first embodiment could also include lipped end portions.

Figure 6:
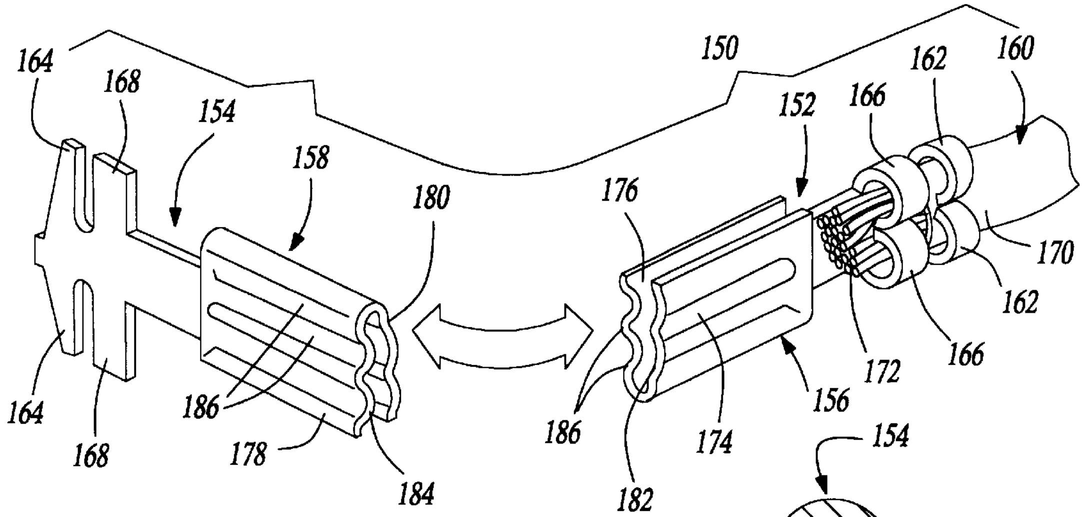
FIG. 6 shows a perspective view of a third embodiment of an electrical terminal connection.

FIG. 6 shows a third embodiment of an electrical terminal connection 150 including two identical terminals 152 and 154 having U-shaped blades 156 and 158 respectively. Terminals 152 and 154 are made of an electrically conductive material, preferably copper. Terminal 152 has been crimped to an insulated electrical wire or cable 160. Terminal 154 shows the shape of a terminal prior to installation upon a wire. Terminals 152 and 154 are shown in an opposed position, with terminal 154 rotated 180° with respect to terminal 152. Connection 150 is designed to connect two opposed wires end to end along a single line.

Each terminal 152 and 154 further includes a pair of retaining tabs 162 and 164 and a pair of conducting tabs 166 and 168 respectively. Retaining tabs 162 of terminal 152 have been crimped to an insulated portion 170 of wire 160 and conducting tabs 166 of terminal 152 have been crimped to an exposed or uninsulated portion 172 of wire 160. Conducting tabs 166 and 168 are in electrical communication with U-shaped blades 156 and 158 respectively.

U-shaped blades 156 and 158 include a pair of spaced legs 174, 176 and 178, 180 respectively. Each pair of spaced legs 174, 176 and 178, 180 is adapted to spread during engagement with a mating terminal. Each leg 174, 176, 178, and 180 is corrugated with a plurality of ribs 186. The ribs 186 extend outwardly of a nominal central plane of the legs. Additionally, each U-shaped blade 156 and 158 has a forward end 182 and 184 respectively. Each forward end 182 and 184 is chamfered to facilitate the alignment and initial engagement of U-shaped blades 156 and 158.

Figure 7:
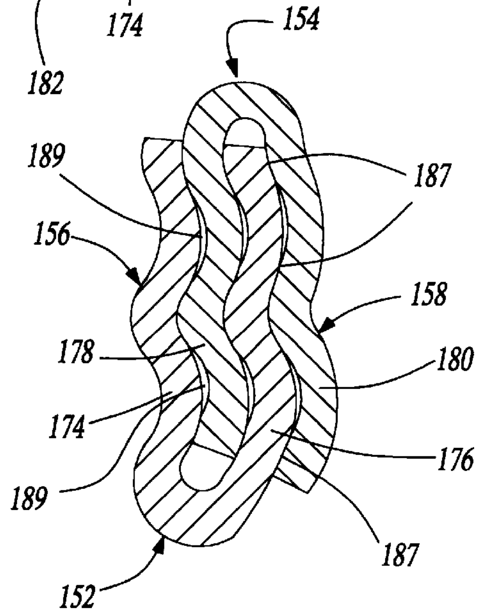
FIG. 7 shows a cross-sectional view of the interconnected FIG. 6 terminals.

To interconnect U-shaped blades 156 and 158 and make an electrical connection, leg 176 of terminal 152 is sandwiched or slid between spaced legs 178 and 180 of terminal 154 while leg 178 of terminal 154 is sandwiched or slid between spaced legs 174 and 176 of terminal 152. FIG. 7 shows a cross-sectional view of U-shaped blades 156 and 158 interconnected to each other. One skilled in the art will appreciate that connection 150 may also be made by sandwiching leg 174 of terminal 152 between legs 178 and 180 of terminal 154 and leg 180 of terminal 154 between legs 174 and 176 of terminal 152.

When U-shaped blades 156 and 158 are interconnected, the ribs 186 of each sandwiched leg contact the ribs of each adjacent leg over a plurality of contact points 187 as shown in FIG. 7. Ribs 186 thus ensure high contact area, and a number of contact points. Space 189 exist between the contact points 187.

FIG. 8 shows a fourth embodiment of an electrical terminal connection 100 including two identical terminals 102 and 104 having W-shaped blades 106 and 108 respectively. Effectively, the W-shaped blades contain the U-shape with an extra leg. Terminals 102 and 104 are made of an electrically conductive material, preferably copper. Terminal 102 has been crimped to an insulated electrical wire or cable 120. Terminal 104 shows the shape of a terminal prior to installation upon a wire. Terminals 102 and 104 are shown in an opposed position, with terminal 104 rotated 180° with respect to terminal 102. Connection 100 is designed to connect two opposed wires end to end along a single line.

Each terminal 102 and 104 further includes a pair of retaining tabs 122 and 124 and a pair of conducting tabs 126 and 128 respectively. Retaining tabs 122 of terminal 102 have been crimped to an insulated portion 130 of wire 120 and conducting tabs 126 of terminal 102 have been crimped to an exposed or uninsulated portion 132 of wire 120. Conducting tabs 126 and 128 are in electrical communication with U-shaped blades 106 and 108 respectively.

W-shaped blades 106 and 108 include a pair of spaced outer legs 134, 136 and 138, 140 respectively. Each W-shaped blade 106 and 108 further includes an intermediate leg 135 and 139 respectively. Intermediate legs 135 and 139 are equally spaced between outer legs 134, 136 and 138, 140 respectively. Additionally, each W-shaped blade 106 and 108 has a forward end 142 and 144 respectively. Each forward end 142 and 144 is chamfered to facilitate the alignment and initial engagement of W-shaped blades 106 and 108.

To interconnect W-shaped blades 106 and 108 and make an electrical connection, intermediate leg 135 of terminal 102 is sandwiched or slid between outer leg 140 and intermediate leg 139 of terminal 104 and outer leg 134 is sandwiched or slid between outer leg 138 and intermediate leg 139 of terminal 104 while intermediate leg 139 of terminal 104 is sandwiched or slid between outer leg 134 and intermediate leg 135 of terminal 102 and outer leg 140 is sandwiched or slid between outer leg 136 and intermediate leg 135 of terminal 102. FIG. 9 shows a cross-sectional view of W-shaped blades 106 and 108 interconnected. One skilled in the art will appreciate that connection 100 may also be made by sandwiching intermediate leg 135 of terminal 102 between outer leg 138 and intermediate leg 139 of terminal 104, outer leg 136 of terminal 102 between outer leg 140 and intermediate leg 139 of terminal 104, intermediate leg 139 of terminal 104 between outer leg 136 and intermediate leg 135 of terminal 102, and outer leg 138 of terminal 104 between outer leg 134 and intermediate leg 135 of terminal 102.

Several embodiments of the present invention have been disclosed, however, a worker of ordinary skill in the art would recognize that certain modifications would come within the scope of even these several embodiments. For that reason the following claims should be studied to determine the true scope and content of this invention.

What is claimed is:

1. An electrical terminal connection comprising:

a first terminal having a U-shaped blade including a first leg spaced from a second leg and connected to a bottom wall, said second leg having lipped end portion extending beyond and curving toward said first leg; and a generally identical second terminal having a generally identical U-shaped blade including a first leg spaced from a second leg and connected to a bottom wall, said second leg having a lipped end portion extending beyond and curved toward said first leg, wherein said first leg of said first terminal is sandwiched between said first and second legs of said second terminal inside said bottom wall of said second terminal and said first leg of said second terminal is sandwiched between said first and second legs of said first terminal inside said bottom wall of said first terminal, and with said lipped end portion of said second leg of said first terminal outside said bottom wall of said second terminal U-shaped blade and said lipped end portion of said second leg of said second terminal outside said bottom wall of said first terminal U-shaped blade.

2. An electrical terminal connection as recited in claim 1, wherein said U-shaped blades of said first and second terminals include at least a pair of spaced outer legs defining said U-shape and one intermediate leg equally spaced between said spaced outer legs, with said intermediate leg of said first terminal sandwiched between said intermediate leg and one of said outer legs of said second terminal and said other of said outer legs of said first terminal sandwiched between said intermediate terminal and said other of said outer legs of said second terminal and said intermediate leg of said second terminal sandwiched between said intermediate leg and said other of said outer legs of said first terminal and said one of said outer legs of said second terminal sandwiched between said intermediate terminal and said one of said outer legs of said first terminal.

3. An electrical terminal connection as recited in claim 1, wherein said first leg has a terminal end spaced from said bottom wall by a first distance, and said second leg extends from said bottom wall thru a second distance which is greater than said first distance.

4. An electrical terminal connection comprising:

a first terminal having a U-shaped blade including a pair of spaced legs with a spring contact strip fixed between said spaced legs; and a generally identical second terminal having a generally identical U-shaped blade including a pair of spaced legs with a spring contact strip fixed between said spaced legs, wherein one of said legs of said first terminal is sandwiched between said spring contact strip covered pair of legs of said second terminal and one of said legs of said second terminal is sandwiched between said spring contact strip covered pair of legs of said first terminal.

5. An electrical terminal connection as recited in claim 4, wherein said leg of said first terminal opposite said sandwiched leg of said first terminal and said leg of said second terminal opposite said sandwiched leg of said second terminal further include a lipped end portion contoured to an adjacent surface of said opposite terminal.

6. An electrical terminal connection as recited in claim 4, wherein said U-shaped blade includes a pair of generally parallel grooves formed in adjacent surfaces of said spaced legs, said spring contact strip includes a plurality of retaining fingers located along opposite edges of said strip, said opposite edges generally aligning with said grooves of said U-shaped blade.

7. An electrical terminal connection as recited in claim 6, wherein said retaining fingers of said spring contact strip are spring loaded into said grooves of said U-shaped blade.

8. An electrical terminal connection as recited in claim 4, wherein said spring contact strip has a plurality of louvers extending at an angle relative to a nominal plane of said legs.

9. An electrical terminal connection as recited in claim 8, wherein each louver has one portion contacting one U-shaped blade and an opposite portion contacting said other U-shaped blade when said terminals are interconnected.

10. An electrical terminal connection as recited in claim 4, wherein said spring contact strip is made from beryllium copper.

11. An electrical terminal connection as recited in claim 4, wherein said spaced legs of each of said U-shaped blades are corrugated with ribs.

12. An electrical terminal connection as recited in claim 11, wherein said ribs of said sandwiched leg of said first terminal align with said ribs of said spaced legs of said second terminal to form a plurality of contact lines parallel to said ribs and said ribs of said sandwiched leg of said second terminal align with said ribs of said spaced legs of said first terminal to form a plurality of contact lines parallel to said ribs.

* * * * *